United States Patent [19]

King et al.

[11] Patent Number: 4,481,278

[45] Date of Patent: Nov. 6, 1984

[54] CHROME COMPLEXED DYE DEVELOPER COMPOUNDS AND PHOTOGRAPHIC PRODUCTS AND PROCESSES

[75] Inventors: Patrick F. King, Needham; Stephen G. Stroud, Brighton, both of Mass.

[73] Assignee: Polaroid Corporation, Cambridge, Mass.

[21] Appl. No.: 437,617

[22] Filed: Oct. 29, 1982

[51] Int. Cl.$^3$ .................... G03C 1/40; G03C 5/54; G03C 7/00; C09B 45/00

[52] U.S. Cl. .................... 430/225; 430/224; 430/243; 430/559; 430/562; 260/429 C; 260/438.5 R; 534/682

[58] Field of Search ............... 430/224, 225, 243, 559, 430/562, 563; 260/146 D, 147, 149, 150, 151, 429 C, 438.5 R

[56] References Cited

U.S. PATENT DOCUMENTS

| | | | |
|---|---|---|---|
| 3,255,001 | 6/1966 | Blout et al. | 430/225 |
| 3,563,739 | 2/1971 | Idelson | 430/224 |
| 3,705,184 | 12/1972 | Goulston et al. | 430/243 |
| 3,789,062 | 1/1974 | Idelson | 260/463 |

*Primary Examiner*—Richard L. Schilling
*Attorney, Agent, or Firm*—Gaetano D. Maccarone

[57] ABSTRACT

Novel chrome complexed azo and azomethine yellow dye developers which include a substantially colorless symmetrical ligand. Also disclosed are photographic products and processes which utilize the dye developers.

24 Claims, No Drawings

CHROME COMPLEXED DYE DEVELOPER COMPOUNDS AND PHOTOGRAPHIC PRODUCTS AND PROCESSES

CROSS-REFERENCE TO RELATED APPLICATIONS

Reference is made to copending patent application Ser. No. 437,611, filed on even date herewith.

BACKGROUND OF THE INVENTION

This invention is directed to novel dye developers which are useful in photographic products and processes and, more particularly, to novel yellow chrome-complexed dye developers.

Metal-complexed dyes are well known in the art. One group of metal-complexed dyes comprises those referred to in the art as 1:1 complexes, a term embracing complexes of one dye molecule complexed to a metal ion. Metal-complexed dyes having a silver halide developing capability, i.e., metal-complexed dye developers, are also well known in the art. Such dye developers are described, for example, in U.S. Pat. No. 3,551,406 and may be illustrated schematically as follows:

Dye-Me-Ligand-Developer wherein "Dye" is a chelatable or complexable dye, "Me" is a metal-complexing atom, "Ligand" is a substantially colorless ligand which contributes at least one and preferably two of the coordinating or donor atoms necessary to form the desired complex and "Developer" is a silver halide developing substituent. It is also known in the art that the developing function in dye developers may be contained on the ligand or on the dye moiety. Many such dye developers which are within the class illustrated above have been disclosed.

SUMMARY OF THE INVENTION

It is the object of this invention to provide novel dye developer compounds which are useful in photographic applications.

It is another object to provide novel yellow 1:1 chrome complexed dye developers.

It is a further object to provide such dye developers which include a symmetrical ligand.

A still further object is to provide dye developers which have a single isomeric form.

Still another object is to provide photographic products and processes which utilize the novel dye developers.

BRIEF SUMMARY OF THE INVENTION

These and other objects and advantages are accomplished in accordance with the invention by providing novel dye developer compounds which are represented by the formula

FORMULA A

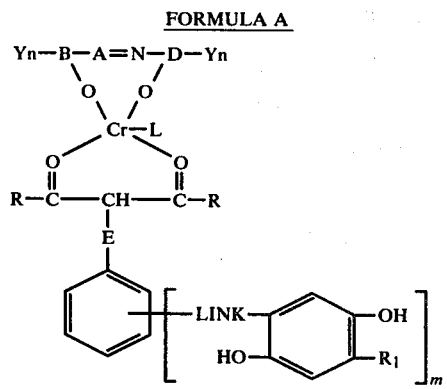

wherein A is —N— or —CH—; B is an aromatic radical, e.g., a radical of benzene or naphthalene including substituted radicals; D is an aromatic radical, e.g., a radical of benzene or naphthalene, or a nitrogen-containing heterocyclic radical, e.g., a radical of pyrazolone or pyrimidine, including substituted radicals: E is alkylene having from 0 to 6 carbon atoms, preferably methylene; L represents a molecule that can satisfy the coordination sphere of chromium such as, for example, $H_2O$, $(CH_3)_2NHCO$, etc; R is hydrogen, alkyl, preferably having from 1 to 6 carbon atoms, alkoxyalkyl, alkylamino, aryl, e.g., phenyl, or a phenylamine radical, or a substituted derivative of such radicals; $R_1$ is hydrogen, alkyl or aryl Y is a silver halide developing substituent; LINK is any suitable divalent linking moiety such as, for example, alkylene, preferably propylene, ether, such as —O—$(CH_2)_x$ where x is an integer of from 1 to 6, sulfonamide such as —$SO_2NH$— or —$NHSO_2$—, carboxamide such as —CONH or —NHCO—, etc; n is 0 or 1; and m is 1 or 2.

For the present invention a silver halide developing substituent (Y) is one containing a benzene or naphthalene nucleus containing at least a hydroxy and/or amino substituent ortho or para to another such substituent. Silver halide developing substituents of this type are well known in the art as evidenced, for example, by Neblette's Handbook of Photography and Reprography, 7th Edition, Van Nostrand Reinhold Company, Inc., (1977), pp 115-118. A preferred group of developing substituents comprises the hydroquinonyls, including substituted derivatives such as alkyl, phenyl and/or alkoxy substituted derivatives of hydroquinone.

In addition to the silver halide developing substituents, the benzene, naphthalene or heterocyclic nucleus may contain substituents linking the developing moiety to the dye moiety. Such linking substituents include aminophenylalkylthio substituents such as are disclosed in U.S. Pat. No. 3,009,958; aminoalkylamino substituents such as are disclosed in U.S. Pat. No. 3,002,997; aminophenylalkyl substituents such as are disclosed in U.S. Pat. No. 3,043,690; aminoalkyl substituents such as are disclosed in U.S. Pat. No. 3,064,884; aminophenyl substituents such as are disclosed in U.S. Pat. No. 3,142,564; aminophenoxy substituents such as are disclosed in U.S. Pat. No. 3,061,434; as well as the various linking substituents disclosed in U.S. Pat. No. 3,255,001.

Since the developer moiety is positioned on the carbon atom between the two carbonyl groups of the ligand the dye developers of the invention have only one isomeric form which is advantageous in photographic applications. It has been found that dye developers which have an unsymmetrical ligand can have a mixture of stereo isomers resulting in photographic complications because the isomers can have different physical and photographic properties.

A preferred group of dye developers within the scope of Formula A is represented by the formula

FORMULA B

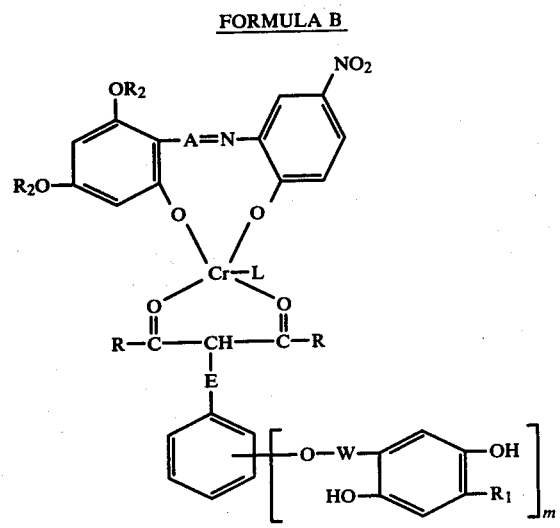

where $R_2$ is alkyl having from 1 to 6 carbon atoms and W is alkylene having from 1 to 6 carbon atoms, preferably propylene.

DESCRIPTION OF THE PREFERRED EMBODIMENTS

Preferred dye developers according to the invention are represented by the formulas

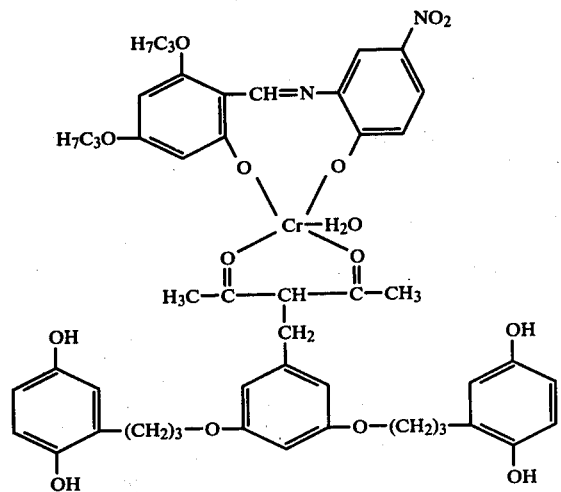

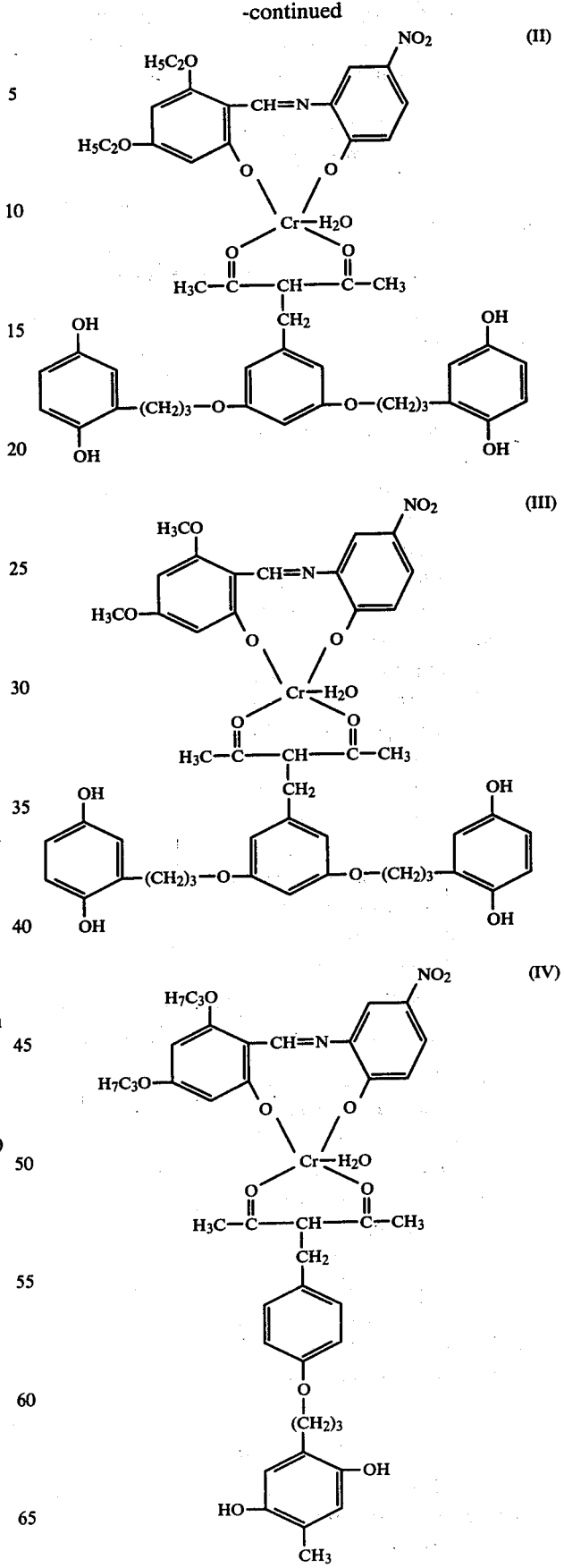

-continued

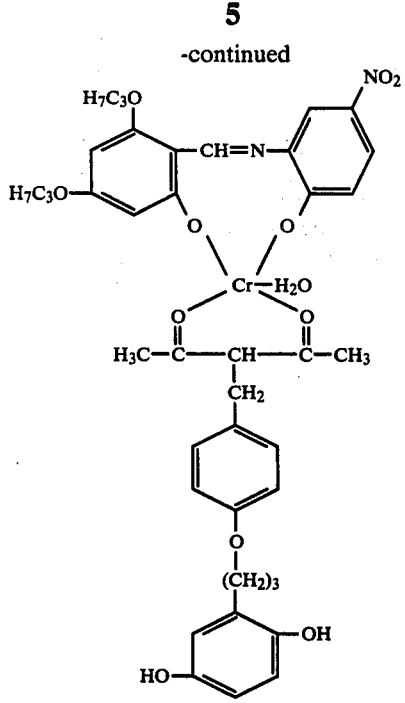

(V)

The compounds of the invention can be prepared by reactions which are well known in the art and such techniques will be apparent from the disclosure which follows. Generally, the dye developers can be prepared by forming a chrome-complexed dye moiety and reacting it with the desired ligand. The chrome-complexed dye moieties can be prepared by art recognized techniques. For example, the preparation of a chrome-complexed azomethine dye compound which can be reacted with a ligand to provide a dye developer within Formula A is described in U.S. Pat. No. 3,597,200. The preparation of a chrome-complexed azo dye compound which can be reacted with a ligand to provide a dye developer within Formula A is described in U.S. Pat. No. 3,563,739.

The dye developers of the invention may be utilized in any film unit which is useful in monochromatic or multicolor photography. In a preferred embodiment of the invention the dye developers are utilized in diffusion transfer photographic film units and processes. As described in U.S. Pat. No. 2,983,606 a photosensitive element containing a dye developer and a silver halide emulsion is photoexposed and a processing composition applied thereto, for example, by immersion, coating, spraying, flowing, etc., in the dark. The exposed photosensitive element is superposed prior to, during, or after the processing composition is applied, on a sheet-like support element which may be utilized as an image-receiving element. In a preferred embodiment, the processing composition is applied to the exposed photosensitive element in a substantially uniform layer as the photosensitive element is brought into superposed relationship with the image-receiving layer. The processing composition, positioned intermediate the photosensitive element and the image-receiving layer, permeates the emulsion to initiate development. The dye developer is immobilized or precipitated in exposed areas as a consequence of the development. In unexposed and partially exposed areas of the emulsion, the dye developer is unreacted and diffusible and thus provides an imagewise distribution of unoxidized dye developer, diffusible in the processing composition, as a function of the point-to-point degree of exposure of the silver halide emulsion. At least part of this imagewise distribution of unoxidized dye developer is transferred, by imbibition, to a superposed image-receiving layer or element, said transfer substantially excluding oxidized dye developer. The image-receiving layer receives a depthwise diffusion, from the developed emulsion, of unoxidized dye developer without appreciably disturbing the imagewise distribution thereof to provide a reversed or positive color image of the developed image. The image-receiving element may contain agents adapted to mordant or otherwise fix the diffused, unoxidized dye developer. In a preferred embodiment of said U.S. Pat. No. 2,983,606 and in certain commercial applications thereof, the desired positive image is revealed by separating the image-receiving layer from the photosensitive element at the end of a suitable imbibition period. Alternatively, as also disclosed in said U.S. Pat. No. 2,983,606, the image-receiving layer need not be separated from its superposed contact with the photosensitive element, subsequent to transfer image formation, if the support for the image-receiving layer, as well as any other layers intermediate said support and image-receiving layer, is transparent and a processing composition containing a substance, e.g., a white pigment, effective to mask the developed silver halide emulsion or emulsions is applied between the image-receiving layer and said silver halide emulsion or emulsions.

Multicolor images may be obtained using dye developers in diffusion transfer processes by several techniques. One such technique contemplates obtaining multicolor transfer images utilizing dye developers by employment of an integral multilayer photsensitive element, such as is disclosed in the aforementioned U.S. Pat. Nos. 2,983,606 and in 3,345,163, wherein at least two selectively sensitized photosensitive strata, superposed on a single support, are processed simultaneously and without separation, with a single common image-receiving layer. A suitable arrangement of this type comprises a support carrying a red-sensitive silver halide emulsion stratum, a green-sensitive silver halide emulsion stratum and a blue-sensitive silver halide emulsion stratum, said emulsions having associated therewith, respectively, for example, a cyan dye developer, a magenta dye developer and a yellow dye developer. The dye developer may be utilized in the silver halide emulsion stratum, for example, in the form of particles, or it may be disposed in a stratum behind the appropriate silver halide emulsion strata. Each set of silver halide emulsion and associated dye developer strata may be separated from other sets by suitable interlayers, for example, by a layer or stratum of gelatin or polyvinyl alcohol. In certain instances, it may be desirable to incorporate a yellow filter in front of the green-sensitive emulsion and such yellow filter may be incorporated in an interlayer. However, where desirable, a yellow dye developer of the appropriate spectral characteristics and present in a state capable of functioning as a yellow filter may be so employed and a separate yellow filter omitted.

Particularly useful products for obtaining multicolor dye developer images are disclosed in U.S. Pat. No. 3,415,644. This patent discloses photographic products wherein a photosensitive element and an image-receiving element are maintained in fixed relationship prior to exposure, and this relationship is maintained as a laminate after processing and image formation. In these products, the final image is viewed through a transparent (support) element against a light-reflecting, i.e., white background. Photoexposure is made through said transparent element and application of the processing composition provides a layer of light-reflecting material (referred to in said patent as an "opacifying agent") preferably titanium dioxide, and it also performs an opacifying function, i.e., it is effective to mask the developed silver halide emulsions so that the transfer image may be viewed without interference therefrom, and it also acts to protect the photoexposed silver halide emulsions from post-exposure fogging by light passing through said transparent layer if the photoexposed film unit is removed from the camera before image formation is completed.

U.S. Pat. No. 3,647,437 is concerned with improvements in products and processes disclosed in said U.S. Pat. No. 3,415,644, and discloses the provision of light-absorbing materials to permit such processes to be performed, outside of the camera in which photoexposure is effected, under much more intense ambient light conditions. A light-absorbing material or reagent, preferably a pH-sensitive phthalein dye, is provided so positioned and/or constituted as not to interfere with photoexposure but so positioned between the photoexposed silver halide emulsions and the transparent support during processing after photoexposure as to absorb light which otherwise might fog the photoexposed emulsions. Furthermore, the light-absorbing material is so positioned and/or constituted after processing as not to interfere with viewing the desired image shortly after said image has been formed. In the preferred embodiments, the light-absorbing material, also sometimes referred to as an optical filter agent, is initially contained in the processing composition together with a light-reflecting material, e.g., titanium dioxide. The concentration of the light-absorbing dye is selected to provide the light transmission opacity required to perform the particular process under the selected light conditions.

In a particularly useful embodiment, the light-absorbing dye is highly colored at the pH of the processing composition, e.g., 13–14, but is substantially non-absorbing of visible light at a lower pH, e.g., less than 10–12. This pH reduction may be effective by an acid-reacting agent appropriately positioned in the film unit, e.g., in a layer between the transparent support and the image-receiving layer.

The dye developers are preferably selected for their ability to provide colors that are useful in carrying out subtractive color photography, that is, the previously mentioned cyan, magenta and yellow. The dye developers employed may be incorporated in the respective silver halide emulsion or, in the preferred embodiment, in a separate layer behind the respective silver halide emulsion, and such a layer of dye developer may be applied by use of a coating solution containing the respective dye developer distributed, in a concentration calculated to give the desired coverage of dye developer per unit area, in a film-forming natural, or synthetic, polymer, for example, gelatin, polyvinyl alcohol, and the like, adapted to be permeated by the processing composition.

Other diffusion transfer products and processes in which the dye developers of the present invention may be utilized are described in U.S. Pat. Nos. 3,573,043 and 3,594,165. For convenience, the entire disclosure of each of the six patents referred to immediately above is hereby incorporated by reference herein.

A particularly useful film unit according to the invention is one wherein the photosensitive element includes a light-reflecting layer between the silver halide layer and the dye developer layer (as described in Canadian Pat. No. 668,592), the substrate of the photosensitive element carries the polymeric acid neutralizing layer which in turn carries the timing layer (as described in U.S. Pat. No. 3,573,043) and the processing composition includes an oximated polydiacetone acrylamide thickening agent (as described in U.S. Pat. No. 4,202,694).

The invention will now be described further in detail with respect to a specific preferred embodiment by way of an example, it being understood that it is illustrative only and the invention is not intended to be limited to the materials, conditions, process parameters, etc. recited therein.

EXAMPLE I

A solution of 1.5 g of a yellow dye represented by the formula

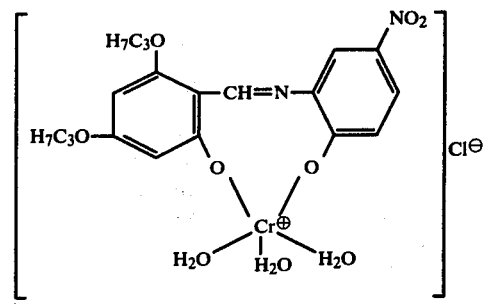

(prepared in accordance with the procedure described in U.S. Pat. No. 3,597,200), 0.73 ml of tri-n-butylamine and 25 ml of ethanol was heated to 50° C., deaerated with nitrogen and to it there was added a solution of 1.6 g of a ligand represented by the formula

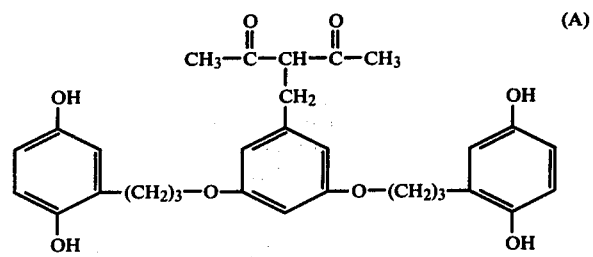

in 15 ml of ethanol. The solution was refluxed for 1 hour, cooled to room temperature and slowly poured into a well stirred solution of 150 ml of water and 2 ml of conc. hydrochloric acid. The resulting solid was collected by filtration, washed with water and dried under vacuum to give 2.5 g (89% yield) of yellow dye developer I, λmax (meth. cell.=390 nm, $\epsilon$=18,000; 415 nm, $\epsilon$=18,400; 440 nm, $\epsilon$=18,000.

$C_{49}H_{55}N_2O_{15}Cr$ requires 61.05% C, 5.75% H, 2.91% N, 24.90% O and 5.40% Cr. Elemental analysis found 60.88% C, 5.87% H, 2.76% N, 24.97% O and 5.21% Cr.

EXAMPLE II

Dye developer II was prepared in accordance with the procedure described in Example I except that ethyl bromide was used in place of propyl bromide in the alkylation of phloroglucinol to form the dye moiety.

Dye developer II exhibited λmax (meth.cell.)=390 nm, ε=18,000; 410 nm, ε=18,500; 445 nm, ε=18,000.

$C_{47}H_{51}N_2O_{15}Cr$ requires 60.31% C, 5.49% H, 2.99% N, 25.64% O and 5.56% Cr. Elemental analysis found 60.30% C, 5.67% H, 2.94% N, 25.25% O and 5.58% Cr.

EXAMPLE III

Dye developer III was prepared in accordance with the procedure described in Example I except that dimethylsulfate was used in place of propyl bromide in the alkylation of phloroglucinol to form the dye moiety. Dye developer III exhibited λmax (meth.cell.)=390 nm, ε=18,400; 442 nm, ε=18,000.

$C_{45}H_{47}N_2O_{15}Cr\cdot H_2O$ requires 58.37% C, 5.34% H, 3.03% N, 27.65% O and 5.62% Cr. Elemental analysis found 58.07% C, 5.36% H, 3.00% N, 27.31% O and 5.43% Cr.

EXAMPLE IV

A solution of 0.925 g of a yellow dye represented by the formula

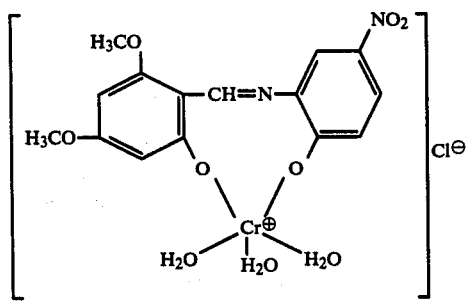

(prepared in accordance with the procedure described in U.S. Pat. No. 3,597,200), 0.28 ml of triethylamine and 10 ml of ethanol was stirred, deaerated with nitrogen for 30 minutes and to it there was added 0.75 g of a ligand represented by the formula

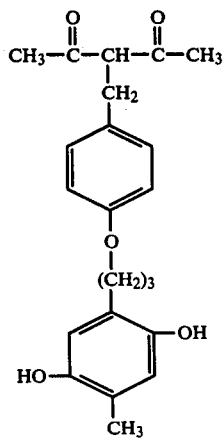

(B)

The mixture was refluxed under nitrogen for 1½ hours and cooled to room temperature. The precipitate was collected by filtration, washed with cold methanol and dried under vacuum to yield 1.2 g (79%) of dye developer IV, λmax (meth.cell.)=385 nm, ε=20,200; 410 nm, ε=20,700; 444 nm, ε=19,800.

$C_{37}H_{39}N_2O_{12}Cr$ requires 58.80% C, 5.20% H, 3.71% N, 25.41% O and 6.88% Cr. Elemental analysis found 58.98% C, 5.37% H, 3.71% N, 24.43% O and 6.77% Cr.

EXAMPLE V

Dye developer V was prepared in accordance with the procedure described in Example IV except that a ligand represented by the formula

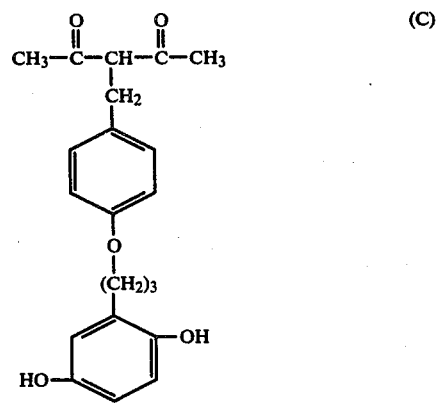

(C)

was used in place of Compound B. Dye developer V exhibited λmax (meth.cell.)=390 nm, ε=19,200; 411 nm, ε=19,600; 442 nm, ε=18,800.

$C_{36}H_{35}N_2O_{11}Cr\cdot H_2O$ requires 58.3% C, 5.0% H, 3.8% N, 25.9% O and 7.0% Cr. Elemental analysis found 58.1% C, 5.3% H, 3.8% N, 25.7% O and 7.1% Cr.

EXAMPLE VI

A film unit according to the invention was prepared. The photosensitive element was made up of an opaque subcoated polyethylene terephthalate film base on which there were coated in succession the following layers:

1. as a polymeric acid layer approximately 8.5 parts of a ½ butyl ester of polyethylene/maleic anhydride copolymer and 1 part of polyvinyl butyral coated at a coverage of about 26,372 mgs/m²;

2. a timing layer comprising about 3750 mgs/m² of a 60/29/6/4/0.4 pentapolymer of butylacrylate, diacetone acrylamide, methacrylic acid, styrene and acrylic acid, and about 56 mgs/m₂ of gelatin;

3. a cyan dye developer layer comprising about 600 mgs/m₂ of a cyan dye developer represented by the formula

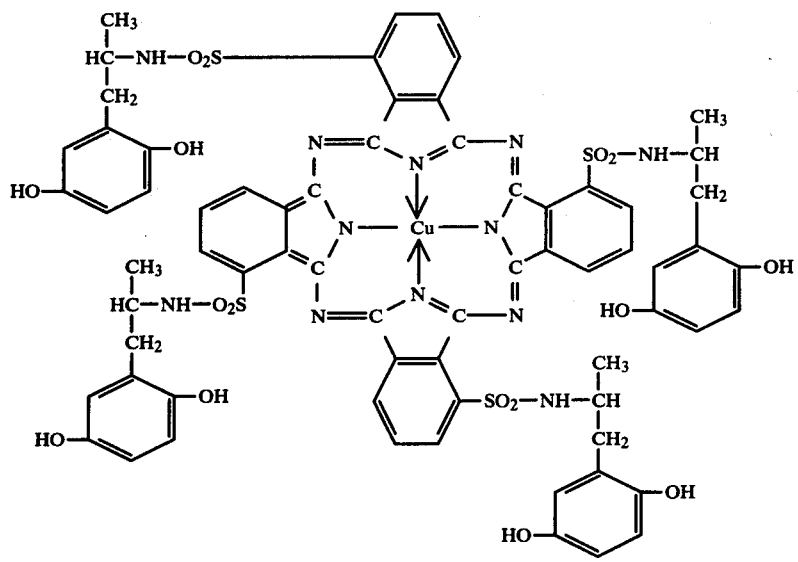

about 400 mgs/m² of gelatin, about 225 mgs/m² of dodecylaminopurine and about 121 mgs/m² of 4'-methyl phenyl hydroquinone;

4. a spacer layer comprising about 1000 mgs/m² of titanium dioxide, about 375 mgs/m² of polymethylmethacrylate as a latex having an average particle size of about $0.11\mu$, about 125 mgs/m² of gelatin and about 375 mgs/m² of the pentapolymer described in layer 2;

5. a red sensitive silver iodobromide emulsion layer comprising about 1300 mgs/m² of silver (1.8 microns) and about 780 mgs/m² of gelatin;

6. an interlayer comprising about 3000 mgs/m² of a 95/5 mixture of the pentapolymer described in layer 2 and polyacrylamide and about 30 mgs/m² of succindialdehyde;

7. a magenta dye developer layer comprising about 550 mgs/m² of a magenta dye developer represented by the formula

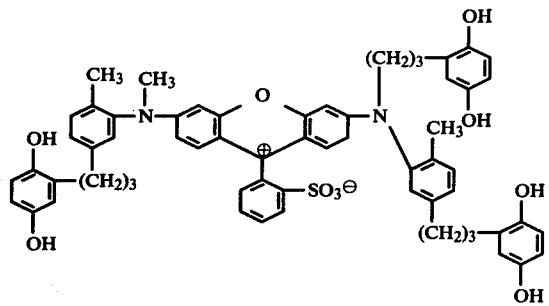

about 275 mgs/m² of gelatin and about 128 mgs/m² of dodecylaminopurine;

8. a green sensitive silver iodobromide emulsion layer comprising about 400 mgs/m² of silver (1.1 microns), about 1100 mgs/m² of silver (1.8 microns) and about 682 mgs/m² of gelatin;

9. an interlayer comprising about 2500 mgs/m² of the 95/5 mixture described in layer 6, about 30 mgs/m² of succindialdehyde and about 4 mgs/m² of formaldehyde;

10. a layer comprising about 250 mgs/m² of 2-phenylbenzimidazole and about 100 mgs/m² of gelatin;

11. a yellow dye developer layer comprising about 1184 mgs/m² of compound II and about 474 mgs/m² of gelatin;

12. a spacer layer comprising about 250 mgs/m² of titanium dioxide, about 188 mgs/m² of polymethylmethacrylate having a particle size of $0.11\mu$ as a latex and about 31 mgs/m² of gelatin;

13. a blue sensitive silver iodobromide emulsion layer comprising about 950 mgs/m² of silver (1.5 microns), about 585 mgs/m² of gelatin and about 250 mgs/m² of 4'-methyl phenyl hydroquinone;

14. a top coat layer of about 484 mgs/m² of gelatin.

The image receiving element was made up of a transparent subcoated polyethylene terephthalate photographic film base on which the following layers were coated in succession:

1. an image receiving layer comprising about 3229 mgs/m² of a graft copolymer of 4-vinylpyridine (4VP) and vinyl benzyl trimethyl ammonium chloride (TMQ) grafted onto hydroxyethyl cellulose (HEC) at a ratio of HEC/4VP/TMQ of 2.2/2.2/1 and about 38 mgs/m² of 1,4-butanediol diglycidyl ether; and 2. an overcoat layer of gelatin coated at a coverage of about 1050 mgs/m².

The film unit was processed with a processing composition made up as follows:

| | Weight Percent |
|---|---|
| Water | 40.5 |
| Titanium dioxide | 47.5 |
| Oximated polydiacetoneacrylamide | 0.66 |
| Potassium hydroxide | 4.45 |
| Benzotriazole | 0.45 |
| Colloidal silica | 0.23 |
| N—phenethyl-α-picolinium bromide | 1.31 |
| 3,5-dimethyl pyrazole | 0.16 |
| Polyethylene glycol (MW 4000) | 0.37 |
| 6-bromo-5-methyl-4-azabenzimidazole | 0.10 |
| 1-(4-hydroxyphenyl)-tetrazoline-5-thione | 0.04 |
| 2-methylimidazole | 0.68 |
| Nickel acetate | 0.29 |
| N—hydroxyethyl-N,N',N'—triscarboxymethyl ethylene diamine | 0.62 |
| Allopurinol | 0.068 |
| 6-methyl uracil | 0.25 |
| 4-aminopyrazolo(3,4d)pyrimidine | 0.21 |

| | Weight Percent |
|---|---|
| [structure] | 0.43 |
| [structure] | 1.47 |

The photosensitive element was exposed (0.5 meter-candle-second) to a test exposure target through the image receiving element and then processed by passing the photosensitive element, in superposed relationship with the image receiving element, through a pair of rollers at a gap spacing of about 76 microns. The red, green and blue $D_{max}$ and $D_{min}$ values for the neutral density columns of the image were read.

| | R | G | B |
|---|---|---|---|
| $D_{max}$ | 1.87 | 2.02 | 2.14 |
| $D_{min}$ | 0.20 | 0.19 | 0.39 |

EXAMPLE VII

A film unit according to the invention was prepared. The film unit was the same as that described in Example VI with the exception that layer 11 of the photosensitive element comprised about 1038 mgs/m² of dye developer III and about 415 mgs/m² of gelatin.

| | R | G | B |
|---|---|---|---|
| $D_{max}$ | 1.89 | 2.00 | 2.08 |
| $D_{min}$ | 0.19 | 0.18 | 0.34 |

EXAMPLE VIII

A film unit according to the invention was prepared. The photosensitive element was the same as that described in Example VI with the exception that layer 11 comprised about 1006 mgs/m² of dye developer I and about 402 mgs/m² of gelatin.

The image receiving element was the same as that described in Example VI. The film unit was processed with a processing composition as described in Example VI with the exception that it had 1.30% of N-phenethyl-α-picolinium bromide instead of 1.31%.

| | R | G | B |
|---|---|---|---|
| $D_{max}$ | 2.09 | 2.19 | 1.67 |
| $D_{min}$ | 0.19 | 0.19 | 0.21 |

EXAMPLE IX

A film unit according to the invention was prepared. The photosensitive element was the same as that described in Example VI with the exception that layer 11 comprised about 915 mgs/m² of dye developer V and about 366 mgs/m² of gelatin.

The image receiving element and the processing composition were the same as those described in Example VIII. The film unit was processed as described above.

| | R | G | B |
|---|---|---|---|
| $D_{max}$ | 1.99 | 2.11 | 2.02 |
| $D_{min}$ | 0.20 | 0.18 | 0.25 |

Although the invention has been described in detail with respect to various preferred embodiments thereof, these are intended to be illustrative only and the invention is not limited thereto but rather those skilled in the art will recognize that modifications and variations may be made therein which are within the spirit of the invention and the scope of the appended claims.

We claim:

1. A compound represented by the formula

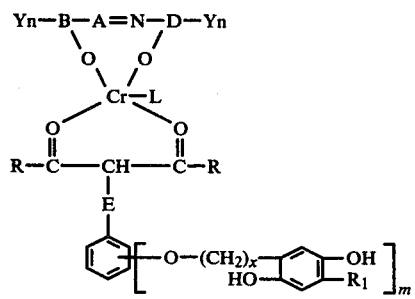

wherein A is —CH— or —N—; B is a radical of benzene or naphthalene; D is a radical of benzene, naphthalene, pyrazolone or pyrimidine; E is alkylene having from 1 to 6 carbon atoms; L represents a molecule that satisfies the coordination sphere of chromium; R is selected from the group consisting of H, alkyl, alkoxyalkyl, alkylamino and aryl; $R_1$ is selected from the group consisting of H, alkyl and aryl; Y is a silver halide developing substituent; x is an integer of from 1 to 6; m is 1 or 2; and n is 0 or 1.

2. A compound as defined in claim 1 wherein x is 3.

3. A compound as defined in claim 2 wherein E is methylene.

4. A compound as defined in claim 3 wherein R is alkyl having from 1 to 6 carbon atoms.

5. A compound as defined in claim 1 which is represented by the formula

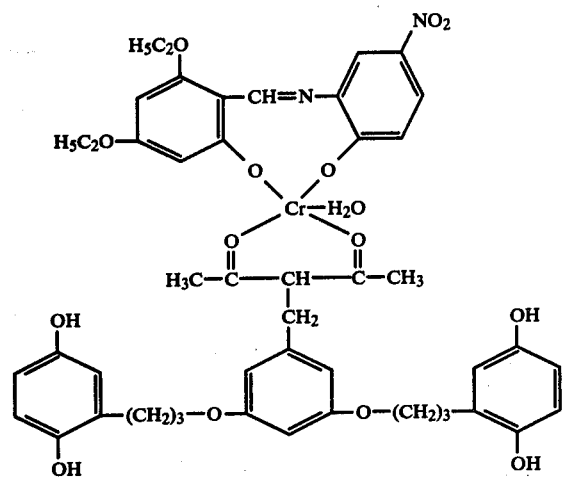

6. A compound as defined in claim 1 which is represented by the formula

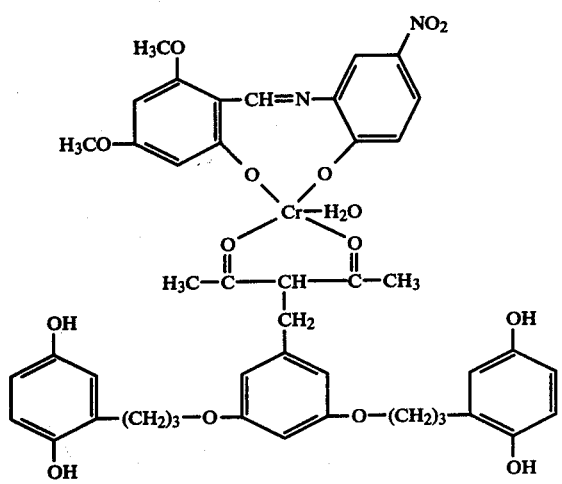

7. A photographic film product which comprises a support carrying a blue sensitive silver halide emulsion layer associated with a yellow dye developer which is represented by the formula

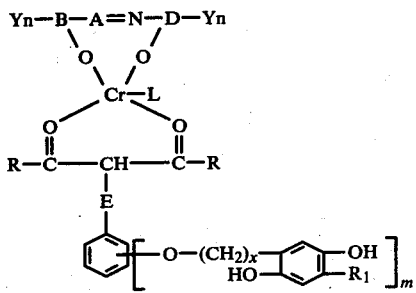

wherein A is —CH— or —N—; B is a radical of benzene or naphthalene; D is a radical of benzene, naphthalene, pyrazolone or pyrimidine; E is alkylene having from 1 to 6 carbon atoms; L represents a molecule that satisfies the coordination sphere of chromium; R is selected from the group consisting of H, alkyl, alkoxyalkyl, alkylamino and aryl; $R_1$ is selected from the group consisting of H, alkyl and aryl; Y is a silver halide developing substituent; x is an integer of from 1 to 6; m is 1 or 2; and n is 0 or 1.

8. A photographic film product as defined in claim 7 wherein x is 3.

9. A photographic film product as defined in claim 8 wherein E is methylene.

10. A photographic film product as defined in claim 9 wherein R is alkyl having from 1 to 6 carbon atoms.

11. A photographic film product as defined in claim 7 wherein said yellow dye developer is represented by the formula

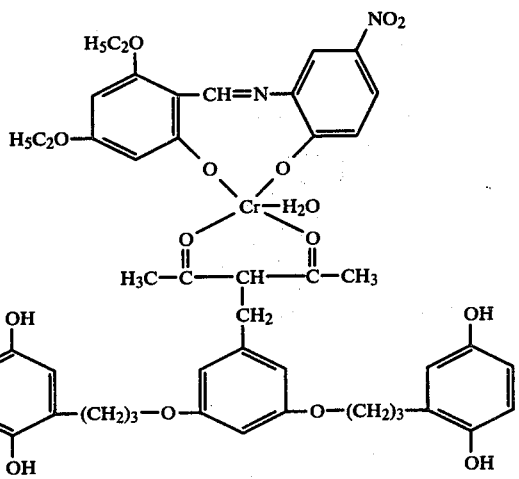

12. A photographic film product as defined in claim 7 wherein said yellow dye developer is represented by the formula

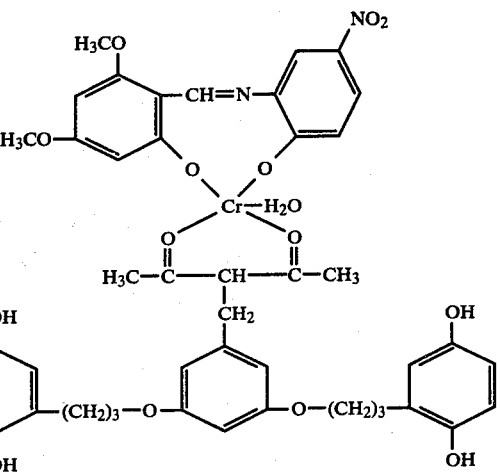

13. A diffusion transfer photographic film unit comprising a first support and a second support, at least one of said supports being transparent; a plurality of layers carried on one of said supports including a red sensitive silver halide emulsion layer associated with a cyan dye developer layer, a green sensitive silver halide emulsion layer associated with a magenta dye developer layer and a blue sensitive silver halide emulsion layer associated with a yellow dye developer layer; an image receiving layer carried on one of said supports; a rupturable container releasably holding a processing composition adapted, when distributed between a pair of predetermined layers carried by said supports, to develop said silver halide emulsion layers and provide a diffusion transfer image in said image receiving layer; means providing a white light-reflecting layer between said image receiving layer and said silver halide emulsion layers after development thereof and to provide a white background for a diffusion transfer image formed in said image receiving layer, said diffusion transfer image being viewable through said transparent support; said supports and layers carried thereon being held in fixed relationship with said silver halide emulsion layers being photoexposable through a transparent support, said yellow dye developer layer comprising a compound represented by the formula

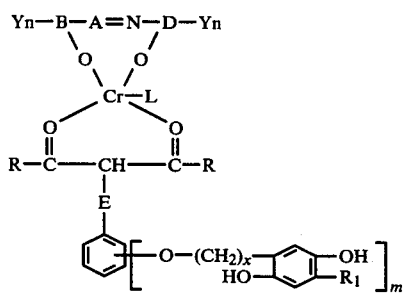

wherein A is —CH— or —N—; B is a radical of benzene or naphthalene; D is a radical of benzene, naphthalene, pyrazolene or pyrimidine; E is alkylene having from 1 to 6 carbon atoms; L represents a molecule that satisfies the coordination sphere of chromium; R is selected from the group consisting of H, alkyl, alkoxyalkyl, alkylamino and aryl; $R_1$ is selected from the group consisting of H, alkyl and aryl; Y is a silver halide developing substituent; x is an integer of from 1 to 6; m is 1 or 2; and n is 0 or 1.

14. A diffusion transfer photographic film unit as defined in claim 13 wherein said image receiving layer is carried by said transparent support, said processing composition includes a white pigment and said rupturable container is so positioned as to distribute its contents between said image receiving layer and said silver halide emulsion layers.

15. A diffusion transfer photographic film unit as defined in claim 14 wherein x is 3.

16. A diffusion transfer photographic film unit as defined in claim 15 wherein E is methylene.

17. A diffusion transfer photographic film unit as defined in claim 16 wherein R is alkyl having from 1 to 6 carbon atoms.

18. A diffusion transfer photographic film unit as defined in claim 13 wherein said yellow dye developer is represented by the formula

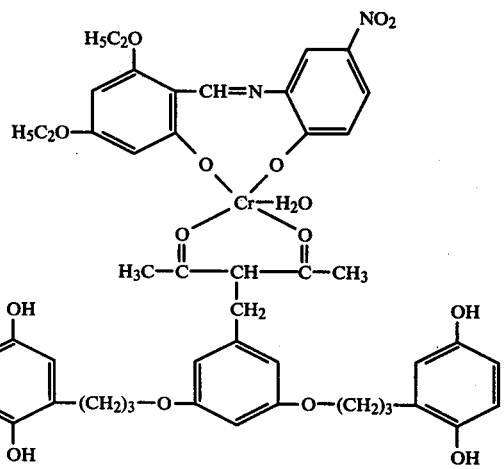

19. A diffusion transfer photographic film unit as defined in claim 13 wherein said yellow dye developer is represented by the formula

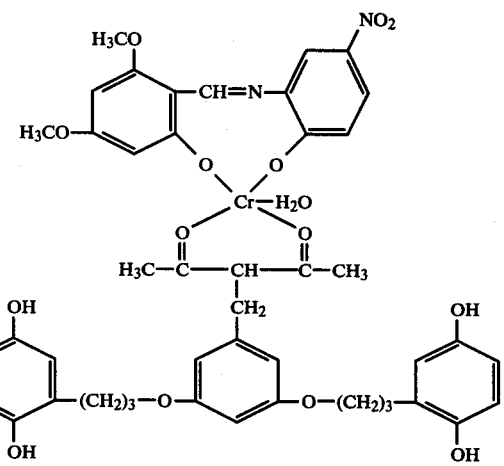

20. A diffusion transfer photographic film unit as defined in claim 13 wherein both said supports are transparent, said image receiving layer and said silver halide emulsion layers are carried by the same support with a layer of white pigment therebetween and said rupturable container is so positioned as to distribute its contents between said silver halide emulsion layers and the transparent support through which photoexposure is effected.

21. A multicolor diffusion transfer photographic process which comprises imagewise exposing a photosensitive element comprising a blue sensitive silver halide emulsion layer having a yellow dye developer layer associated therewith, a green sensitive silver halide emulsion layer having a magenta dye developer layer associated therewith and a red sensitive silver halide emulsion layer having a cyan dye developer layer associated therewith and applying an aqueous alkaline processing composition to said exposed photosensitive element to effect development and to form an imagewise distribution of unoxidized dye developer in undeveloped areas of each of said silver halide emulsion layers as a function of said development, said process including the step of transferring at least a portion of said imagewise distributions of unoxidized dye developers to an image receiving layer in superposed relationship therewith to thereby provide a multicolor diffusion transfer image, said yellow dye developer layer including a dye developer as defined in claim 1.

22. A diffusion transfer photographic process as defined in claim 21 wherein x is 3.

23. A diffusion transfer photographic process as defined in claim 22 wherein E is methylene.

24. A diffusion transfer photographic process as defined in claim 23 wherein R is alkyl having from 1 to 6 carbon atoms.

* * * * *